M. Caywood,
Stalk Cutter.

No. 107,662.  Patented Sep. 27, 1870.

Witnesses  
N. A. Daniels  
J. W. Hester

Martin Caywood  
by A. McCallum & W. B. Richards  
Attorneys

United States Patent Office.

MARTIN CAYWOOD, OF PEORIA, ILLINOIS.

Letters Patent No. 107,662, dated September 27, 1870.

IMPROVEMENT IN STALK-CUTTERS.

The Schedule referred to in these Letters Patent and making part of the same.

I, MARTIN CAYWOOD, of Peoria county, and State of Illinois, have invented certain Improvements in Stalk-Cutters, of which the following is a specification.

Nature and Objects of the Invention.

The nature of my invention relates to improvements in that class of stalk-cutters in which a frame carrying the cylinder of cutters is pivoted, at its rear end, to a supporting-frame mounted on wheels; and The invention consists in the arrangement and combination therewith of hand and also foot-levers, for the purpose of raising the cutters from the ground, when desired, and for the purpose of enabling the operator to increase the weight on the cutters when needed, all as hereinafter fully described.

Description of the Accompanying Drawing.

Figure 1:
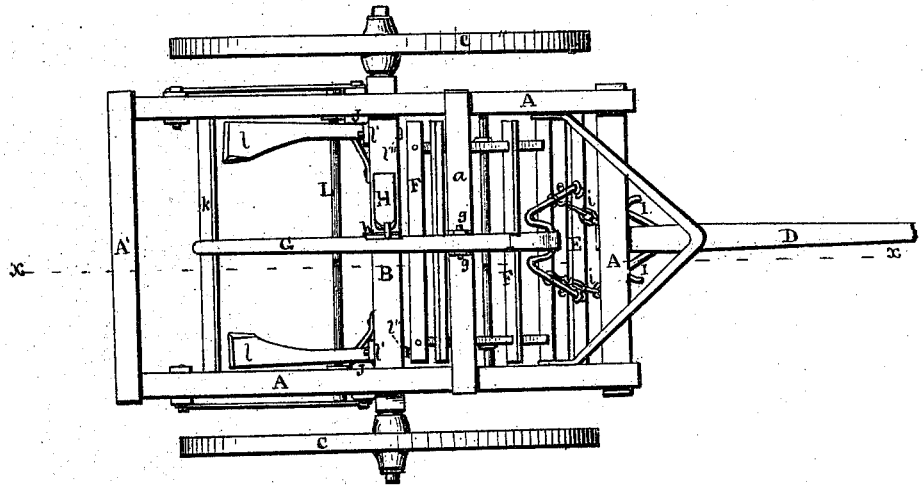
Figure 2:
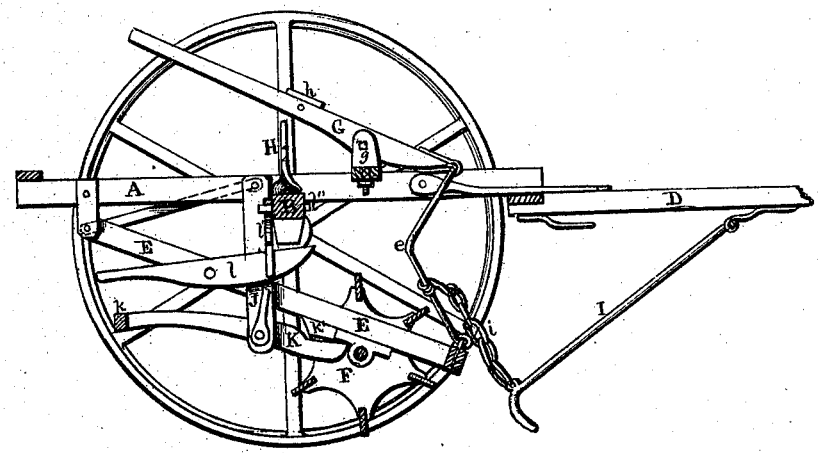

Figure 1 is a top plan or view of my invention.
Figure 2 is a vertical sectional view of fig. 1, on the plane of the line $x\ x$.

General Description.

A represents the main frame, which is a plain rectangle, and is supported on the axle B and wheels C, and provided with a draft-pole, D, and may be braced as required.

E E represent a swinging frame, pivoted at its rear end to the frame A, and provided, near its forward end, with suitable bearings for the shaft carrying the cylinder of cutters F.

G is a lever, pivoted in ears or lugs, $g\ g$, on the cross-piece $a$, and its forward end connected by rods $e\ e$ with the forward end of the swinging frame E.

H is a rack-bar, extending upward from the axle B, and engaging the catch $h$, on the lever G.

I I are hooks, pivoted forward to the under side of the tongue or draft-pole, and their hooked or free ends connected by chains $i\ i$ with the rods $e\ e$.

J J are guides, extending downward from the main frame on each side, and forming guides, to prevent lateral movement of the swinging frame E E.

K K are levers, pivoted between the guides J, their forward ends impinging against the under side of the frame-pieces E E, and their rear ends connected by cross-piece $k$.

$k'$ is an inclined plane or wedge-shaped block, one of which is placed where each of the forward ends of levers K K strike the frame E E, with their large end to the rear, in order to cause a slight vibration of levers K K, to raise the cylinder of cutters F clear from the ground.

L is a rod, extending from one of the frame-pieces E across to the other E. On this rod are pivoted the foot-levers $l\ l$, having fulcrums under the pieces or plates $l'\ l'$.

The plates $l'\ l'$ are slotted, and secured to the axle B by bolts $l''\ l''$, allowing their vertical adjustment for adaptation to different operators, boys or men. By pressure on the rear ends of levers $l\ l$, the weight of the operator may be thrown onto the cutters F.

The operation of my invention is as follows:

The driver's seat is on the cross-frame-piece A'.

The lever G being released from the rack-bar H, the cylinder of cutters F will drop to the ground, carrying with them the hooks I I, and the machine is ready for operation, the hooks I I serving to draw the stalks into the line of progression of the machine, and the cutters F chopping or cutting them into short pieces, in the usual manner.

Should it be necessary, from any cause, to increase the weight on the cutters, it may be done by the driver simply pressing with his feet on the ends of the levers $l\ l$. When it is desired to raise the cutters F from the ground, and secure them in that position, it may be done by bringing down the rear end of the lever G, and engaging the catch $h$ with the rack-bar H; and, in case it is needed, assistance in the last operation may be acquired by the operator stepping onto the cross-bar $k$; or should the operator desire to raise the cutters F temporarily while the machine is in operation, he may do so by pressure with his feet on the bar $k$ connecting the levers K.

It will be seen that the hooks I I, being connected by links with the rods $e\ e$, will be raised from the ground simultaneously with cutters F by the operation of the levers G or K K. Also, that the bars J J not only serve as guides and stays for the frame E E, but also as supports for the pivots on which the levers K K oscillate.

Claims.

I claim as my invention—

1. The arrangement of the chains $i\ i$, rods $e\ e$, hooks I I, and frame E E, with the levers G and K K, for joint operation, substantially in the manner and for the purpose specified.

2. The foot-levers $l\ l$, pivoted to the frame-pieces E E, and having their fulcrums under the adjustable plates $l'\ l'$, when arranged to operate substantially as and for the purpose specified.

3. The combination and arrangement of the levers K K, cross-bar $k$, guides J J, with the frame E E, the forward end of the levers K K impinging on the incline planes $k'\ k'$, all substantially as described, and for the purpose specified.

4. The combination of the lever G, rods $e\ e$, and rack-bar H, with the frames A A and E E, and foot-levers K K and guides J J, substantially as described, and for the purpose specified.

MARTIN CAYWOOD.

Witnesses:
HORATIO J. COYKENDALL,
JOHN DEYS.